United States Patent [19]
Yoshida

[11] Patent Number: 5,155,722
[45] Date of Patent: Oct. 13, 1992

[54] RECORDING/REPRODUCING APPARATUS

[75] Inventor: Takaharu Yoshida, Yokohama, Japan

[73] Assignee: Kabushiki Kaisha Toshiba, Kawasaki, Japan

[21] Appl. No.: 585,679

[22] Filed: Sep. 20, 1990

[30] Foreign Application Priority Data

Sep. 29, 1989 [JP] Japan .................................. 1-254879

[51] Int. Cl.⁵ .............................................. G11B 7/00
[52] U.S. Cl. ..................................... 369/116; 369/54
[58] Field of Search ................. 369/48, 50, 54, 116, 369/275.3, 47, 44.27

[56] References Cited

U.S. PATENT DOCUMENTS 4,972,399 11/1990 Miyasaka ........................ 369/44.27

FOREIGN PATENT DOCUMENTS

0301909A2  2/1989  European Pat. Off. .
3727681A1  3/1988  Fed. Rep. of Germany .
2575857A1  7/1986  France .
58-215076 12/1983 Japan ..................... 369/47
59-42653   3/1984  Japan ..................... 369/275
59-60742   4/1984  Japan ..................... 369/54
61-137275  6/1986  Japan ..................... 369/292
61-243974 10/1986  Japan .
61-258384 11/1986  Japan ..................... 369/275

Primary Examiner—Roy N. Envall, Jr.
Assistant Examiner—Nabil Hindi
Attorney, Agent, or Firm—Finnegan, Henderson, Farabow, Garrett and Dunner

[57] ABSTRACT

In an optical disk apparatus which reads specifications data from a control track on various types of optical disks requiring different laser powers for data reading, in reading data from the control track, the power of the laser beam of a semiconductor laser oscillator is set low according to an optical disk requiring a low-power laser beam for data reading, and when accessing the control track indicates that the optical disk actually requiring a high-power laser beam, the power of the laser beam is changed to high power.

8 Claims, 8 Drawing Sheets

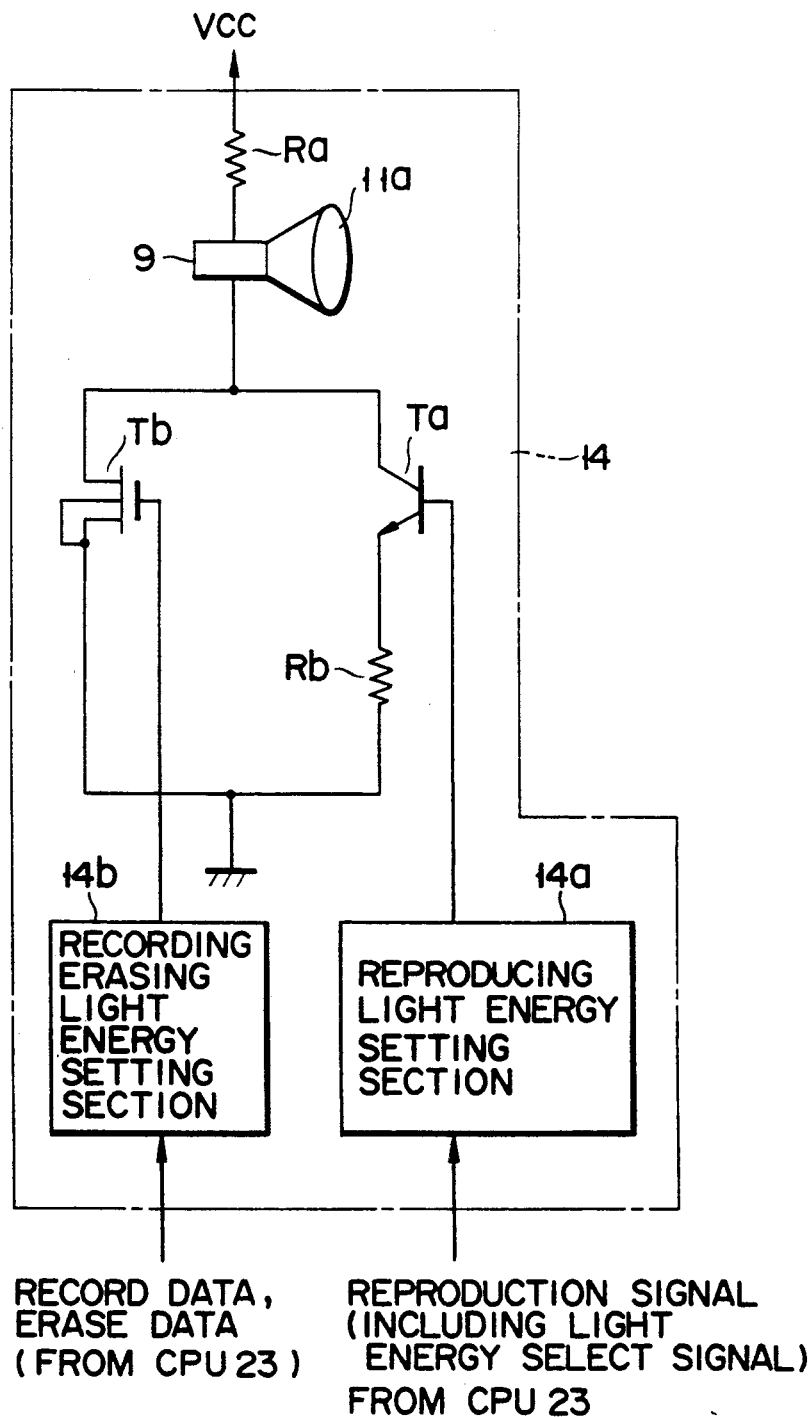
F I G. 6

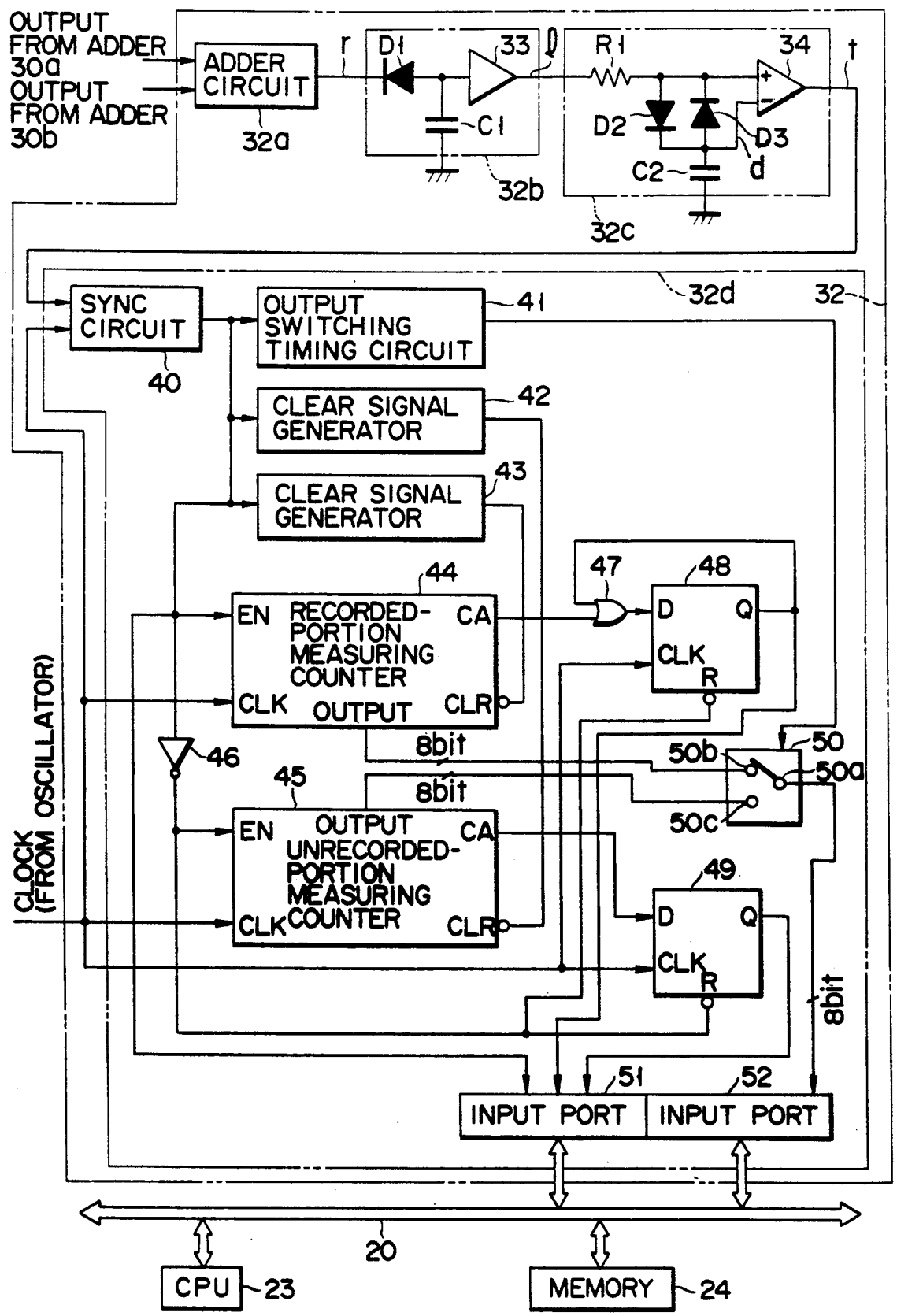
F I G. 7

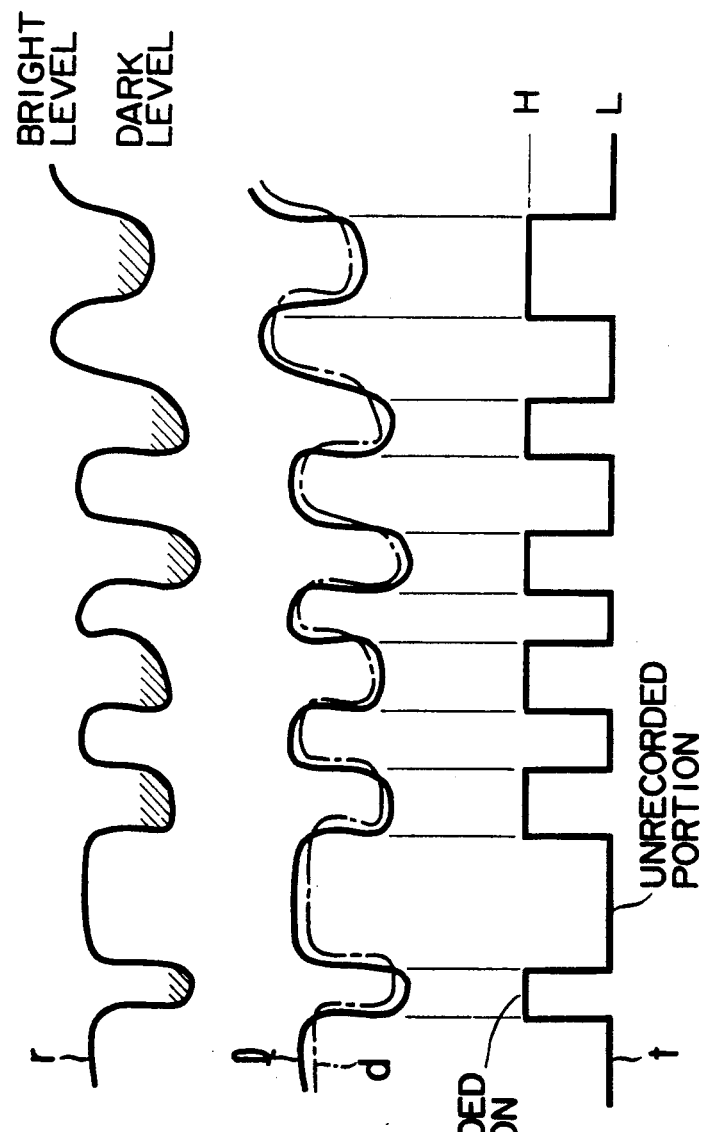

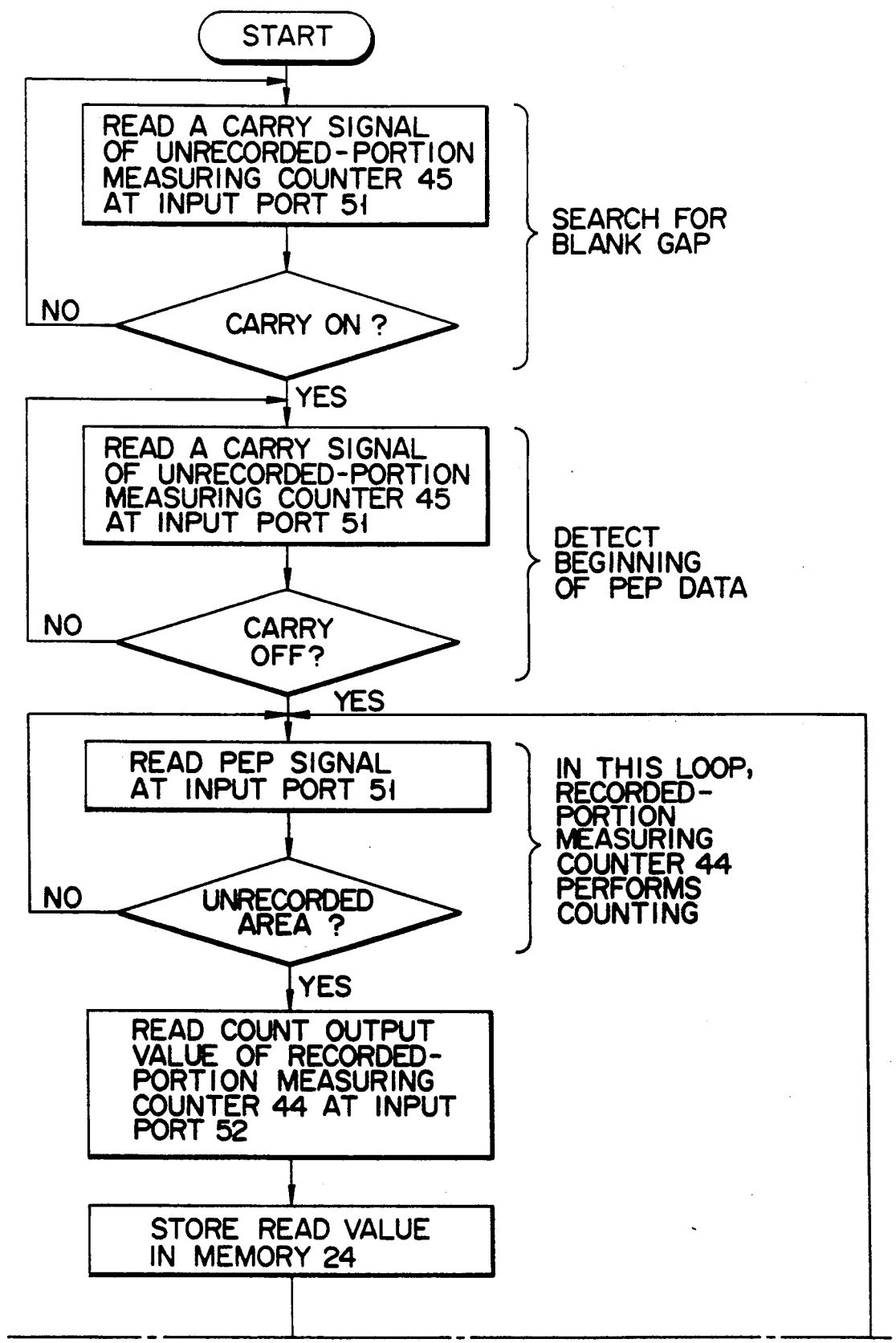
F I G. 9A

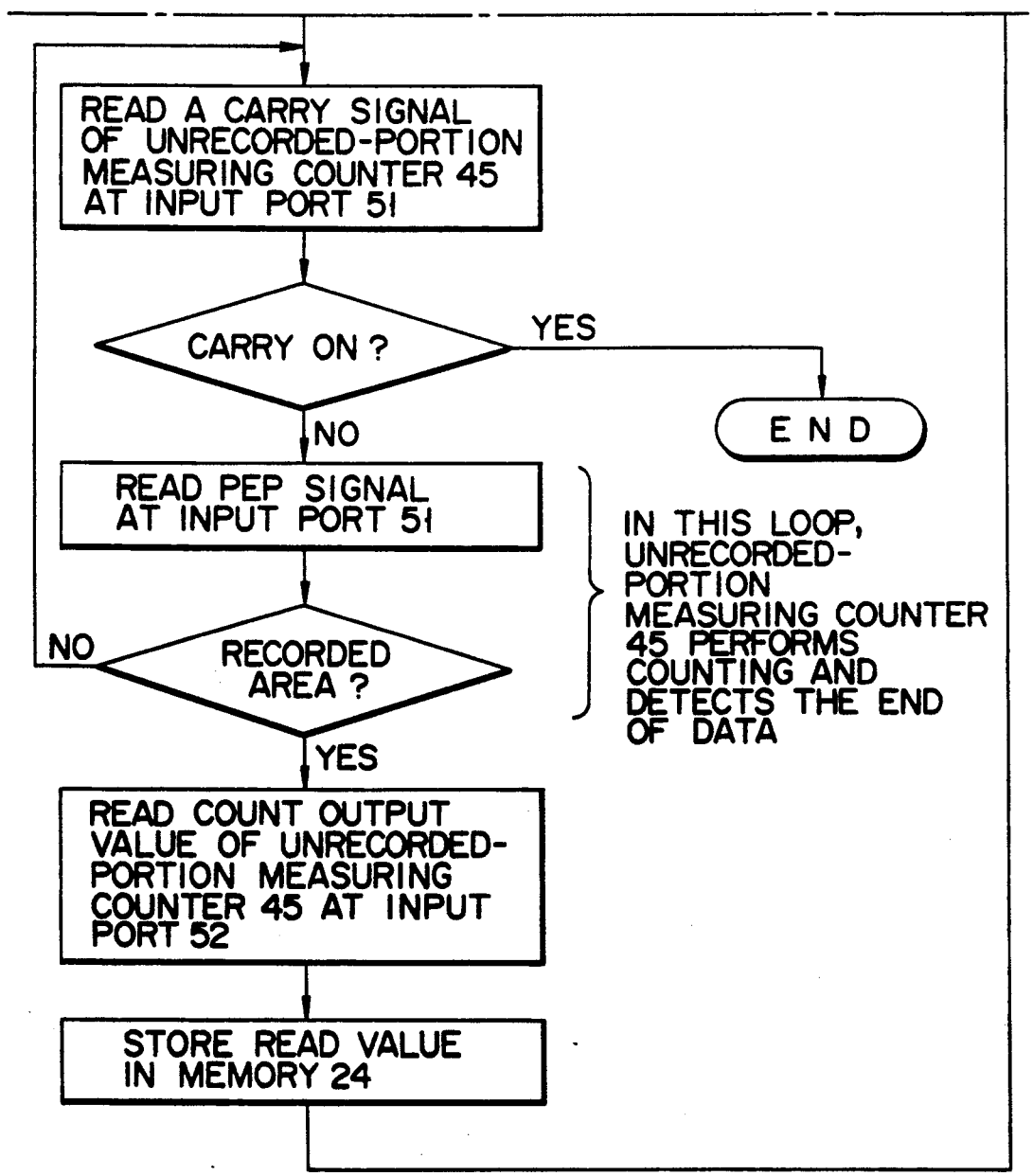
F I G. 9B

RECORDING/REPRODUCING APPARATUS

BACKGROUND OF THE INVENTION

1. Field of the Invention

The present invention relates to a recording/reproducing apparatus, and, more particularly, to an optical disk apparatus which optically records data on tracks of an optical disk, or reads recorded data therefrom by rotating the optical disk in relation to an optical head.

2. Description of the Related Art

Image filing systems use an optical disk apparatus, which records data on spiral or concentric tracks formed on an optical disk o reproduces recorded data therefrom while rotating the optical disk.

An original is two-dimensionally scanned so that its image data is photoelectrically converted into electric image data. The electric image data is optically recorded on the tracks of the optical disk by an optical head. The recorded data is retrieved by the optical head at the time of retrieval and is reproduced as a hard copy or a soft copy.

The optical disk apparatus performs data writing or data reading with a laser beam produced by a semiconductor laser oscillator provided in the optical head. In such an optical disk apparatus, the specifications of usable optical disks, such as the reflection factor, the laser powers required for data writing and data reading, and the number of sectors around the optical disk, are fixed.

There is a demand and movement to permit the use of optical disks with different specifications which are manufactured by various companies. If optical disks have different specifications mentioned above, they cannot generally be used in a single optical disk apparatus.

As a solution to this shortcoming, there is proposed an optical disk on which specifications data such as mode data different for each manufacturer, or a so-called control track, is recorded for standardization. This control track is recorded in a specifications data recording area for specifications data, which is located inward of a data recording area where record data is to be recorded. Data of the specifications indicating the manufacturer of this optical disk is recorded in bar code on this control track. Each bar of the bar code consists of a group of pits arranged in rows and columns.

Also recorded on the control track is data, such as the reflection factor, the laser powers required for data writing and data reading, and the number of sectors around the optical disk, in order to determine the reading/writing specifications.

In this case, there are two types of optical disks: re-writable optical disks which require a high-power laser beam for data reading and write-once type optical disks which require a low-power laser beam for data reading. When a high-power laser beam is erroneously irradiated on the write-one optical disk to access the control track, the data on the optical disk would likely be destroyed.

SUMMARY OF THE INVENTION

Accordingly, it is an object of the present invention to provide a recording/reproducing apparatus, which reads specifications data from the specifications data recording area on various types of optical disks requiring different laser powers for data reading and which prevents data on an optical disk designed for a low-power laser beam from being destroyed even when a high-power laser beam is erroneously irradiated thereon for data reading.

To achieve the object, according to the present invention, there is provided a recording/reproducing apparatus for recording information on an optical recording medium by means of a laser beam of a recording power-level, and for reproducing recorded information from the medium by means of a laser beam of a reproducing power-level which is lower than the power level for recording, the optical recording medium having a recording layer selected from various types of recording layers including a first area on which information is recorded and reproduced, and a second area for storing data representing the power levels for recording and reproducing in accordance with the type of a recording layer, the recording/reproducing apparatus comprising means for generating laser beams of recording power-levels and laser beams of reproducing power-levels, and applying the laser beams to the recording layer, means for moving the generating means to the first and second areas, means for causing the generating means to generate a specific laser beam of a level equal to the lowest reproducing power level when the generating means is moved to the second area, means for detecting light reflected from the second area and for generating a detection signal, and means for selecting the power level to be generated by the generating means in accordance with the detection signal.

Further according to the present invention, there is provided an optical disk apparatus for recording data on, and reading data from, an optical disk, the apparatus comprising an optical disk having a data recording area in which data is to be recorded, and from which data is to be read, and a specifications data recording area which is surrounded by the data recording area and consists of a plurality of tracks, in each of which three identical items of specifications data are recorded, each item representing specifications of the optical disk, such as the reflection factor of the optical disk, laser powers required for writing data from, and reading data in, the data recording area, and the number of sectors of the optical disk; an optical head having laser means for generating a low-power laser beam and a high-power laser beam, both for reading data, and photoelectric conversion means for converting light, which is reflected from the data recording area when the low-power laser beam is applied to the data recording area, to an electric signal; head-moving means for moving the optical head in a radial direction of the optical disk, from the specifications data recording area to the data recording area; detecting means for detecting recorded portions and unrecorded portions of the data recording area of the optical disk, in accordance with the electric signal generated by the optical head; specification-determining means for determining, from data defined by the recorded and unrecorded portions which the detecting means detects the specifications such as the reflection factor of the optical disk, laser powers required for writing data from, and reading data in, the data recording area, and the number of sectors of the optical disk; and control means for controlling the optical head such that the laser means of the optical head generates a low-power laser beam or a high-power laser beam in accordance with the specifications determined by the specification-determining means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 6 is a schematic diagram illustrating the arrangement of a laser controller;

FIG. 7 is a schematic diagram illustrating the structure of a control track read circuit;

FIGS. 8A, 8B, and 8C are signal waveform diagrams showing signal waveforms at individual sections in the control track read circuit shown in FIG. 1; and FIGS. 9A and 9B are flowcharts for explaining an operation to read data from the control track.

DETAILED DESCRIPTION OF THE PREFERRED EMBODIMENT

Figure 1:
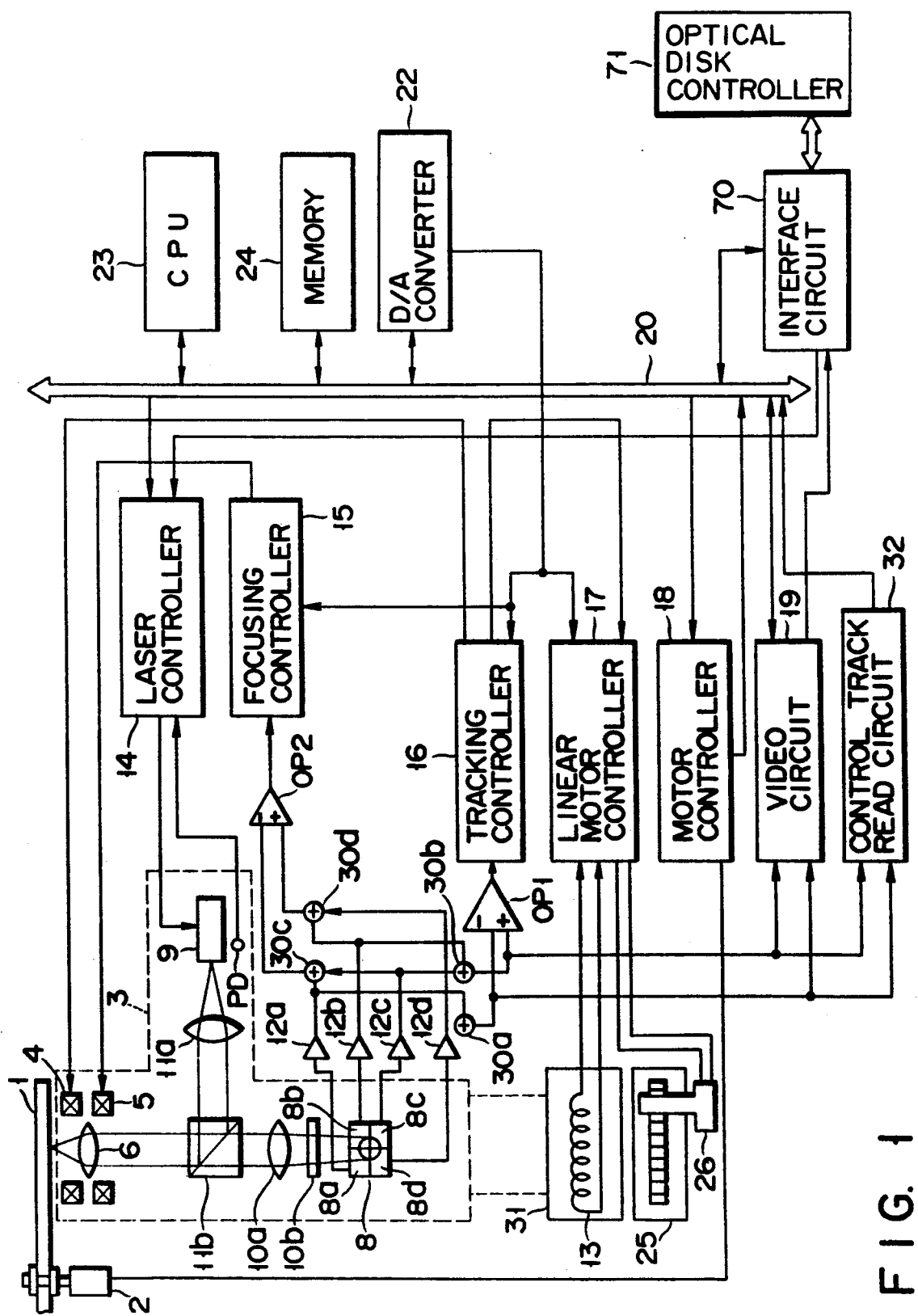
FIG. 1 is a diagram schematically illustrating one embodiment of an optical disk apparatus according to the present invention.

FIG. 1 schematically illustrates one embodiment of an optical disk apparatus according to the present invention.

An optical disk 1 shown in FIG. 1 has spiral or concentric grooves (tracks) formed on its surface. This optical disk 1 is driven at, for example, a constant speed (1800 rpm), by a motor 2 which is controlled by a motor controller 18.

The optical disk 1 may be a rewritable type which requires a high-power laser beam of 1.5 mW for data reading and a write-one type which needs a low-power laser beam of 0.4 mW for the same purpose. For the former type, a laser beam of 8 to 10 mW is used for data recording or erasing.

Figure 2:
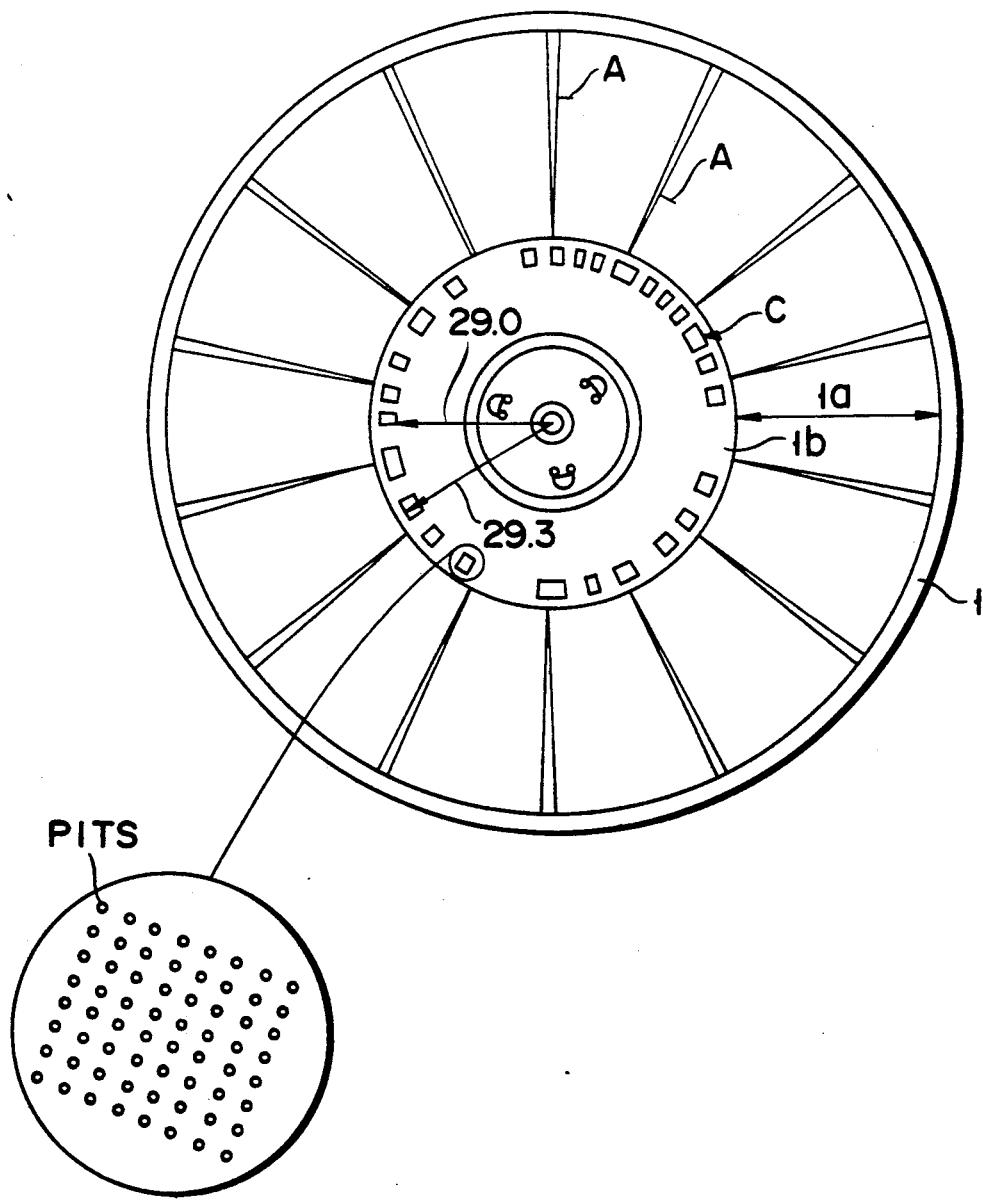
FIG. 2 is a plan view illustrating a data recording area and specifications data recording area shown in FIG. 1.

As shown in FIG. 2, the optical disk 1 comprises a glass or plastic, disk-shaped substrate with a diameter of, for example, 5.25 in (about 13.3 cm), and a metal coating layer or recording film, which is coated in a doughnut shape on one surface of the substrate and is composed of tellurium or bismuth.

As shown in FIG. 2, the optical disk 1 has on its surface a data recording area 1a having tracks formed therein and a specifications data recording area 1b located inward of the data recording area 1a. The latter area 1b has no guide grooves formed therein.

The data recording area 1a is divided into a plurality of sectors with a reference mark as its reference point. Data of a variable length is recordable over a plurality of blocks on the optical disk 1; there are 300,000 blocks formed on 36,000 tracks on the optical disk 1.

In the data recording area 1a, a block header A, as preformat data, is recorded at the beginning of each block, a recording unit, at the time the optical disk 1 is manufactured. The block header A includes a block number and a track number.

In the specifications data recording area 1b, a control track C is likewise recorded at the time of manufacturing the optical disk 1. The same data is recorded three times for one revolution, in a bar code shape in the circumferential direction on the control track C. The specifications data includes the reflection factor as the film characteristic of the optical disk 1, the laser powers of a semiconductor laser oscillator required for data writing, data erasing and data reproduction, and the number of sectors around the optical disk, as a format type.

As shown in FIG. 2, the control track C indicates data in the form of consecutive or non-consecutive columns of bits, and is recorded radially in the radial direction of the optical disk 1. The recording position of the control track C is defined by the distance from the center of the optical disk 1 or the radial position thereof.

For instance, the control track C is recorded over a region from the position of the radius of 29.0 cm to the position of the radius of 29.3 cm.

Figure 3:
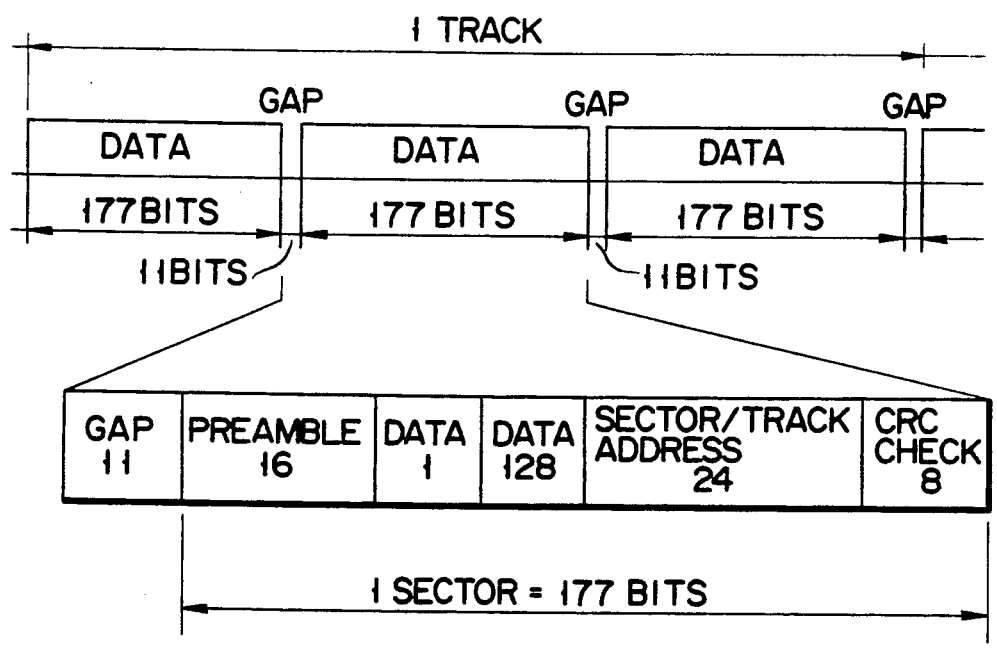
FIG. 3 is a diagram showing the structure of a control track on an optical disk shown in FIG. 1.

As shown in FIG. 3, the control track C consists of three sectors each including a gap, preamble, a sync signal, specifications data, sector/track address data and CRC check data.

Figure 4:
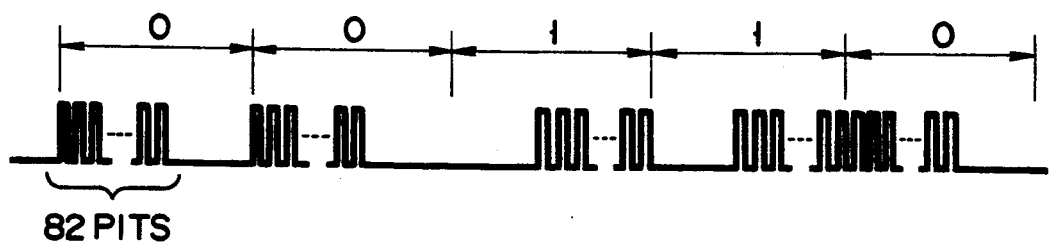
FIGS. 4 and 5 are diagrams showing a 1-bit structure on the control track of the optical disk in FIG. 1.

With regard to one bit of data on the control track C, it is determined to be bit "0" if 82 consecutive pits exist at the first half of the optical disk 1, and is considered to be bit "1" if 82 consecutive pits exist at the second half, as shown in FIG. 4.

Figure 5:
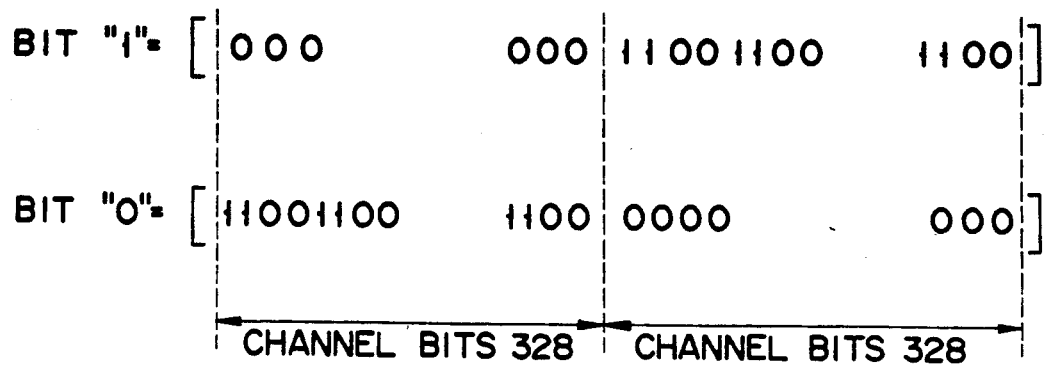

Also, as shown in FIG. 5, one bit of data on the control track C is determined to be bit "0" if plural columns of pits exist in 328 channel bits at the first half of the optical disk 1, and is considered to be bit "1" if plural columns of pits exist in 328 channel bits at the second half.

An optical head 3 is disposed below the optical disk 1, close to the bottom thereof. As shown in FIG. 1, this optical head 3 comprises an objective lens 6, drive coils 4 and 5 for driving the objective lens 6, a photosensor 8, a semiconductor laser oscillator 9, a focusing lens 10a, a cylindrical lens 10b, a collimator lens 11a for collimating a laser beam from the laser oscillator 9, a half prism 11b and a light-receiving element PD for detecting the amount of light emitted from the laser oscillator 9.

As shown in FIG. 1, the objective lens 6 is suspended from a fixed portion (not shown) by a wire suspension. This objective lens 6 moves in the focusing direction or along the optical axis of the lens 6 when driven by the drive coil 5, and moves in the tracking direction or in the direction perpendicular to the optical axis of the lens 6 when driven by the drive coil 4.

The optical head 3 is secured to a drive coil 13 serving as a movable portion of a linear motor 31. The drive coil 13 is connected to a linear motor controller 17 which is connected to a linear motor position detector 26. This position detector 26 detects an optical scale 25 provided at the optical head 3 and outputs a position signal.

At a fixed portion of the linear motor 31, a permanent magnet (not shown) is provided so that when the drive coil 13 is excited by the linear motor controller 17, the laser beam from the optical head 3 moves in the radial direction of the optical disk 1 with the movement of the linear motor 31.

A laser beam generated by the semiconductor laser oscillator 9, which is driven by a laser controller 14, is irradiated on the optical disk 1 through the collimator lens 11a, the half prism 11b and the objective lens 6. Reflection light from the optical disk 1 is led to the photosensor 8 through the objective lens 6, half prism 11b, focusing lens 10a and cylindrical lens 10b.

In response to a command from a CPU 23 (to be described later), the laser controller 14 causes the semiconductor laser oscillator 9 to generate a high-power laser beam of 1.5 mW for data reading or a low-power laser beam of 0.4 mW for data reading. In response to a command from the CPU 23, the laser controller 14 permits the semiconductor laser oscillator 9 to generate a laser beam with power of 8 to 10 mW for data recording or data erasing.

As shown in FIG. 6, the laser controller 14 comprises a setting section 14a for setting the amount or energy of reproducing light, a setting section 14b for setting the amount or energy of recording/erasing light, an NPN type transistor Ta, an FET (Field Effect Transistor) Tb, and resistors Ra and Rb.

The reproducing light energy setting section 14a sends a drive signal, corresponding to a reproduction signal and a light energy select signal supplied from the CPU 23, to the base of the transistor Ta.

The recording/erasing light energy setting section 14b outputs a control signal, associated with a modulation signal corresponding to record data from the CPU 23 at the time of data recording, to the gate of the FET Tb. The setting section 14b also outputs a control signal, supplied from the CPU 23 at the time of data erasing, to the gate of the FET Tb.

In the transistor Ta, a current is amplified by an amplification factor corresponding to the drive signal from the setting section 14a. With different current amplifications of the transistor Ta, different currents flow through the semiconductor laser oscillator 9 so that the laser oscillator 9 generates a high-power laser beam of 1.5 mW for data reading and a low-power laser beam of 0.4 mw for data reading accordingly.

The FET Tb is rendered ON or OFF by the control signal supplied from the setting section 14b. The FET Tb, when turned ON, permits a current to flow to the semiconductor laser oscillator 9 which in turn generates a laser beam with power of 8 to 10 mW.

The emitter of the transistor Ta and the drain of the FET Tb are both connected to a voltage source ($V_{CC}$) through the semiconductor laser oscillator 9 and resistor Ra. The transistor Ta has its collector grounded through the resistor Rb, and the FET Tb has it source grounded.

The photosensor 8 comprises four photosensor cells 8a, 8b, 8c and 8d, as shown in FIG. 1.

The output signal of the photosensor cell 8a is supplied via an amplifier 12a to one end of an adder 30a as well as one end of an adder 30c. The output signal of the photosensor cell 8b is supplied via an amplifier 12b to one end of each of adders 30b and 30d. The output signal of the photosensor cell 8c is supplied via an amplifier 12c to the other end of each of the adders 30b and 30c. The output signal of the photosensor cell 8d is supplied via an amplifier 12d to the other end of each of the adders 30a and 30d.

The output signal of the adder 30a is supplied to an inverting input terminal of a differential amplifier OP1 whose non-inverting input terminal is supplied with the output signal of the adder 30b. The differential amplifier OP1 sends a track difference signal corresponding to the difference between the outputs of the adders 30a and 30b, to a tracking controller 16. The tracking controller 16 prepares a track drive signal in accordance with the track difference signal from the differential amplifier OP1.

The track drive signal from the tracking controller 16 is sent to the drive coil 4 that moves the objective lens in the tracking direction. The track difference signal used in the tracking controller 16 is sent to the linear motor controller 17.

The output signal of the adder 30c is supplied to an inverting input terminal of a differential amplifier OP2 which non-inverting input terminal is supplied with the output signal of the adder 30d. The differential amplifier OP2 sends a signal associated with the focus point and corresponding to the difference between the outputs of the adders 30c and 30d, to a focusing controller 15. The output signal of this focusing controller 15 is supplied to the focusing drive coil 5, so that the laser beam is controlled to be always just in focus on the optical disk 1.

With the focusing and tracking being effected, a signal representing the sum of the outputs of the individual photosensor cells 8a to 8d of the photosensor 8, or the output signals of the adders 30a and 30b reflect the upheaval statuses of the pits (recorded data) formed on the tracks. These signals are supplied to a video circuit 19 which reproduces image data and address data (track number, sector number, etc.).

A binary signal reproduced by video circuit 19 is output via an interface circuit 70 to an optical disk controller 71.

The output signals of the adders 30a and 30b are also supplied to a control track read circuit 32. In accordance with the received signals, the control track circuit 32 outputs count values as time intervals corresponding to the recorded portion corresponding to the recorded data on the control track C and the unrecorded portion.

At the time of accessing the control track C, the count values of the control track read circuit 32 are sent to the CPU 23 (which will be described later).

At the time of accessing the control track C, the CPU 23 causes the optical head 3 to move from the innermost track on the optical disk 1. When the optical head 3 moves by 11.5 scales of the optical scale 25, the CPU 23 determines that the optical head 3 is positioned at the vicinity of the center of the control track C, and stops the optical head 3. At this time, the CPU 23 checks the count values supplied from input ports 51 and 52 (to be described later) of the control track read circuit 32, i.e., the time intervals of the recorded portion and unrecorded portion, to read out the specifications data on the control track C, and performs an operational control in accordance with this specifications data. In other words, this apparatus is controlled in accordance with different optical disks 1 having different specifications (companies).

The optical disk apparatus employs a D/A converter 22 to ensure data exchange between the CPU 23 and the focusing controller 15, tracking controller 16, or linear motor controller 17.

The tracking controller 16 moves the objective lens 6 to shift the laser beam by one track in accordance with a track jump signal supplied via the D/A converter 22 from the CPU 23

The laser controller 14, focusing controller 15, tracking controller 16, linear motor controller 17, motor controller 18, and the video circuit 19 are controlled via a bus line 20 by the CPU 23. These units are controlled by a program stored in a memory 24 under the control of the CPU 23.

As shown in FIG. 7, the control track read circuit 32 comprises an adder circuit 32a, a low-level detector 32b, a binary value producing circuit 32c and a time interval counting section 32d.

The lower-level detector 32b comprises a diode D1, an integrator comprising a capacitor C1 and an amplifier 33. The binary value producing circuit 32c comprises diodes D2 and D3, a resistor R1, a capacitor C2 and a comparator 34.

The time interval counting section 32d comprises a sync circuit 40, an output switching timing circuit 41, clear signal generators 42 and 43, recorded-portion measuring counter 44, an unrecorded-portion measuring counter 45, an inverter circuit 46, an OR circuit 47, flip-flop circuits (FF circuits) 48 and 49, a switch 50, and input ports 51 and 52.

The adder circuit 32a adds the output signals of the adders 30a and 30b and outputs a reproduction signal r corresponding to the sum of the detection signals of the photosensor cells 8a to 8d. The lower-level detector 32b detects the lower-level of the reproduction signal r from the adder circuit 32a and produces a lower-level detection signal 1 which is a signal resulting from the detection of the peak of the dark level of the reproduction signal r. The comparator 34 of the binary value production circuit 32c compares the lower-level detection signal 1 from the lower-level detector 32b with a delay signal d which is acquired by delaying a former signal 1. If the delay signal d is smaller than the lower-level detection signal 1, the comparator 34 outputs an "H"-level signal or a signal corresponding to the recorded portion. Accordingly, a binary signal t corresponding to the recorded data on the control track C is output to the time interval counting section 32d.

For instance, the lower-level detection signal 1 as shown in FIG. 8B is detected from the reproduction signal r as shown in FIG. 8A and the binary signal t as shown in FIG. 8C is acquired by comparing the first two signals 1 and d with each other.

The time interval counting section 32d detects a blank gap based on the binary signal t from the binary value producing circuit 32c, and the number of counts of the recorded portion and unrecorded portion following this blank gap is output to the CPU 23.

The sync circuit 40 synchronizes the binary signal t from the binary value producing circuit 32c with a clock from an oscillator (not shown), and sends its output to the output switching timing circuit 41, clear signal generators 42 and 43, recorded-portion measuring counter 44, and input port 51. The output of the sync circuit 40 is also supplied to the unrecorded-portion measuring counter 45 after being inverted by the inverter circuit 46. The output switching timing circuit 41 switches a switch contact 50a of the switch 50 to a fixed contact 50b when the signal from the sync circuit 40 has an "L" level, and switches the switch contact 50a to a fixed contact 50c when the signal from the sync circuit 40 has an "H" level.

When the level of the signal from the sync circuit 40 is changed to the "L" level from the "H" level, the clear signal generator 42 outputs a clear signal to the unrecorded-portion measuring counter 45. When the level of the signal from the sync circuit 40 is changed to the "H" level from the "L" level, the clear signal generator 43 outputs a clear signal to the recorded-portion measuring counter 44. When the "H"-level signal is supplied from the sync circuit 40, the recorded-portion measuring counter 44 counts the number of clocks from the oscillator. When the "H"-level signal is supplied via the inverter circuit 46 from the sync circuit 40, the unrecorded-portion measuring counter 45 counts the number of clocks from the oscillator. The count values of the counters 44 and 45 are selectively output to the CPU 23 via the switch 50, input port 52 and bus line 20. When the unrecorded-portion measuring counter 45 corresponds to the blank gap, an overflow occurs and a carry signal is output. When the recorded-portion measuring counter 44 corresponds to dust, an overflow occurs and a carry signal is output. The carry signal of the recorded-portion measuring counter 44 is sent via the OR circuit 47 to the FF circuit 48, then is output therefrom to the input port 51. The carry signal of the unrecorded-portion measuring counter 45 is sent to the FF circuit 49, then is output therefrom to the input port 51.

When the level of the signal supplied to the input port 51 from the sync circuit 40 is changed to the "L" level from the "H" level, the input port 52 outputs the count value of the recorded-portion measuring counter 44 supplied from the switch 50 to the CPU 23 through the bus line 20. When the level of the signal supplied to the input port 51 from the sync circuit 40 is changed to the "H" level from the "L" level, the input port 52 outputs the count value of the unrecorded-portion measuring counter 45 supplied from the switch 50 to the CPU 23 through the bus line 20.

Referring now to the flowchart shown in FIGS. 9A and 9B, description will be given of the operation of reading the control track C with the above structure. Assuming that a command to access the control track C is supplied to the CPU 23 from the optical disk controller 71, then the CPU 23 controls the linear motor controller 17 to move the optical head 3 outward from the innermost track.

When the linear motor 41 is moved by 11.5 scales or when the laser beam from the optical head 3 is positioned in the vicinity of the center of the control track C, the CPU 23 stops the optical head 3.

The CPU 23 then causes the semiconductor laser oscillator 9 to generate a laser beam with power of 0.4 mW. This low-power laser beam of 0.4 mW for data reading from the laser oscillator 9 is irradiated on the optical disk 1 through the collimator lens 11a, half prism 11b and objective lens 6. Light reflected from the optical disk 1 is led to the photosensor 8 through the objective lens 6, half prism 11b, focusing lens 10a, and cylindrical lens 10b.

The output signal of the photosensor cell 8a is supplied via the amplifier 12a to one end of the adder 30a as well as one end of the adder 30c. The output signal of the photosensor cell 8b is supplied via the amplifier 12b to one end of each of the adders 30b and 30d. The output signal of the photosensor cell 8c is supplied via the amplifier 12c to the other end of each of the adders 30b and 30c. The output signal of the photosensor cell 8d is supplied via the amplifier 12d to the other end of each of the adders 30a and 30d.

Under the above circumstance, the signals from the adders 30a and 30b are supplied to the adder circuit 32a. The adder circuit 32a then outputs the reproduction signal r as shown in FIG. 8A, corresponding to the sum of the detection signals from the photosensor cells 8a–8d, to the lower-level detector 32b.

The lower-level detector 32b detects the lower level of the reproduction signal r from the adder circuit 32a, and outputs the lower-level detection signal 1, indicated by the solid line in FIG. 8B, to the binary value producing circuit 32c. The comparator 34 of the binary value producing circuit 32c compares the lower-level detection signal 1 from the detector 32b with the delay signal d, which is acquired by delaying the signal 1 as indicated by the broken line in FIG. 8B. When the delay signal d is smaller than the lower-level detection signal 1, the comparator 34 outputs a signal of the "L" level. When the lower-level detection signal 1 is smaller than the delay signal d, the comparator 34 outputs a signal of the "H" level. As a result, the binary signal t in FIG. 8C corresponding to the recorded data of the control track C is output to the time interval counting section 32d.

Accordingly, the counting section 32d detects a blank gap using the binary signal t from the binary value producing circuit 32c, and data corresponding to the number of counts of the recorded portion and the unrecorded portion following the blank gap is output to the CPU 23.

That is, when a signal of the "L" level corresponding to the unrecorded portion is output from the sync circuit 40, the unrecorded-portion measuring counter 45 counts the clocks from the oscillator. When the count value of the counter 45 causes an overflow, a carry signal is sent to the FF circuit 49 which in turn outputs the carry signal to the CPU 23 through the input port 51 and bus line 20. The CPU 23 detects the blank gap from the carry signal and determines the beginning of one sector of the control track C.

When the level of the output of the sync circuit 40 is changed to the "H" level corresponding to the recorded portion from the "L" level corresponding to the unrecorded portion, the clear signal from the clear signal generator 43 and the "H"-level signal from the sync circuit 40 are supplied to the recorded-portion measuring counter 44. Consequently, the counter 44 is initialized to start counting the number of clocks from the oscillator (not shown).

When the level of the output of the sync circuit 40 is changed to the "L" level, corresponding to the unrecorded portion, from the "H" level, corresponding to the recorded portion, the counting operation of the recorded-portion measuring counter 44 is stopped and the movable contact 50a of the switch 50 is switched to the fixed contact 50b by the switching signal from the output switching timing circuit 41. As a result, the count value from the counter 44 is output to the input port 52 via the switch 50.

Further, the clear signal from the clear signal generator 42 and the "L"-level signal from the sync circuit 40 are supplied to the unrecorded-portion measuring counter 45. Consequently, the counter 45 is initialized to start counting the number of clocks from the oscillator (not shown).

When the level of the output of the sync circuit 40 is changed to the "H" level corresponding to the recorded portion, from the "L" level, corresponding to the unrecorded portion, the count value of the recorded-portion measuring counter 44 supplied via the switch 50 to the input port 52 is output over the bus line 20 to the CPU 23. The CPU 23 stores the count value of the recorded portion in the memory 24. At this time, the counting operation of the unrecorded-portion measuring counter 45 is stopped.

Then, the movable contact 50a of the switch 50 is set to the fixed contact 50c by the switching signal from the output switching timing circuit 41. Consequently, the count value from the unrecorded-portion measuring counter 45 is output via the switch 50 to the input port 52. The clear signal from the clear signal generator 43 and the "H"-level signal from the sync circuit 40 ar supplied to the recorded-portion measuring counter 44. As a result, the counter 44 is initialized to start counting the number of clocks from the oscillator (not shown).

When the level of the output of the sync circuit 40 is changed to the "L" level, corresponding to the unrecorded portion, from the "H" level, corresponding to the recorded portion, the count value of the unrecorded-portion measuring counter 45 supplied via the switch 50 to the input port 52 is output over the bus line 20 to the CPU 23. The CPU 23 stores the count value of the unrecorded portion in the memory 24. Thereafter, the count value of the recorded portion and that of the unrecorded portion are likewise stored in the memory 24.

When data for one sector is read out, or when the carry signal from the unrecorded-portion measuring counter 45 is supplied again to the CPU 23 and the CPU 23 determines it as a blank gap, the CPU 23 checks the time intervals of the recorded portion and unrecorded portion using the count values stored in the memory 24 and reads out (demodulates) the specifications data on the control operation track C. The CPU 23 then performs a control corresponding to the read-out specifications data. That is, the CPU 23 performs a control corresponding to different optical disks 1 with various specifications (companies).

For instance, when it is determined from the specifications data that data reading for the optical disk 1 requires a high-power laser beam, the CPU 23 outputs a switching signal to the laser controller 14. In response to the switching signal, the laser controller 14 switches the power of the laser beam from the semiconductor laser oscillator 9 to a high power (1.5 mW).

Further, the film characteristic (reflection factor) of the optical disk 1, the power of the semiconductor laser oscillator 9 for data recording, the format type (number of sectors per track), etc. are controlled by the specifications of the optical disk.

As described above, in reading data from the control track, the power of the laser beam of the semiconductor laser oscillator 9 is set low according to an optical disk requiring a low-power laser beam for data reading, and when accessing the control, track indicates that the optical disk actually requires a high-power laser beam, the power of the laser beam is changed to high power.

Accordingly, in an optical disk apparatus which reads specifications data from the control track on various types of optical disks requiring different laser powers for data reading, it is possible to prevent data on an optical disk designed for a low-power laser beam from being destroyed even when a high-power laser beam is erroneously irradiated thereon for data reading.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A recording/reproducing apparatus for recording information on an optical recording medium by means of a laser beam of a recording power level, and for reproducing recorded information from the optical recording medium by means of a laser beam of a reproducing power level, which is lower than the recording power level, said optical recording medium having a recording layer selected from various types of recording layers, and including a first area on which information is recorded and from which information is reproduced, and a second area for storing data representing the power levels for recording and reproducing of the selected recording layer, said recording/reproducing apparatus comprising:

means for generating laser beams of various power levels, including laser beams of recording power levels and laser beams of reproducing power levels, and for applying the laser beams to the selected recording layer;

means for moving said generating means from said second area to said first area;

means for detecting data representing the power levels stored in said second area on the basis of light reflected from said second area, the detecting means including photoelectric conversion means for converting the light reflected from said second area into electric signal data representing the detected power levels;

means for causing said generating means to generate a laser beam having a power level which is equal to a lower one of the detected reproducing power levels, when said generating means is in said second area, and for causing said generating means to generate a laser beam having a selected power level, when said generating means is in said first area;

wherein said detecting means further includes:

lower-level detector means for detecting a peak of a dark level of the electric signal output by said photoelectric conversion means and for outputting a lower-level detection signal representing the detected peak of the dark level;

binary value producing means for comparing said lower-level detection signal with a delay signal produced by delaying said lower-level detection signal by a predetermined amount, and for producing a binary signal representing the difference between the lower-level detecting signal and the delay signal, and corresponding to recorded and unrecorded portions; and interval-determining means for determining the intervals at which said recorded portions are arranged, based on said binary signal produced by said binary value producing means.

2. A recording/reproducing apparatus according to claim 1, wherein said data stored in the second area of said optical recording medium is constituted by a bar code consisting of bars each formed of dots arranged in rows and columns.

3. A recording/reproducing apparatus according to claim 1, wherein said second area is provided on an inner track side on said optical disk.

4. A recording/reproducing apparatus according to claim 1, wherein plural pieces of identical data are stored in a plurality of tracks of said second area.

5. The optical disk apparatus according to claim 1, wherein said binary value producing circuit comprises a comparator.

6. An optical disk apparatus for recording data on an optical disk and for reading data from an optical disk, said apparatus comprising:

an optical disk having a data recording area in which data is to be recorded, and from which data is to be read, and a specifications data recording area which is surrounded by the data recording area and consists of a plurality of tracks, in each of which three items of specifications data are recorded, each item representing specifications of the optical disk, such as the reflection factor of the optical disk, laser powers required for writing data from and for reading data in the data recording area, and the number of sectors of the optical disk;

an optical head, including laser means for generating a low-power laser beam and a high-power laser beam, both laser beams being used for reading data, and photoelectric conversion means for converting light which is reflected from the specifications data recording area when the low-power leaser beam is applied to the specifications data recording area into an electric signal;

head-moving means for moving said optical head in a radial direction of said optical disk from said specifications data recording area to the data recording area;

first control means for controlling the laser beams generated by the laser means of the optical head to have a low power level when the laser means irradiates the specifications data recording area;

specification-determining means for determining the specifications of the optical disk from the specifications data recording area;

second control means for controlling said optical head so that the laser means generates one of a lower-power laser beam and a high-power laser beam on said data recording area in accordance with the specifications determined by said specification-determining means; and sensing means for sensing recorded portions and unrecorded portions of the data recording area when said optical head is in said data recording area;

wherein said specification determining means further includes:

lower-level detector means for detecting a peak of a dark level of the electric signal output by said photoelectric conversion means and for outputting a lower-level detection signal representing the detected peak of the dark level;

binary value producing means for comparing said lower-level detection signal with a delay signal produced by delaying said lower-level detection signal by a predetermined amount, and for producing a binary signal representing the difference between the lower-level detecting signal and the delay signal, and corresponding to said recorded and unrecorded portions; and interval-determining means for determining the intervals at which said recorded portions are arranged, based on said binary signal produced by said binary value producing means.

7. The optical disk apparatus according to claim 6, wherein said specifications data to be recorded in said specifications data recording area of said optical disk is constituted by a bar code consisting of bars each formed of dots arranged in rows and columns.

8. The optical disk apparatus according to claim 6, wherein said binary value producing circuit comprises a comparator.

* * * * *